3,373,015
STAINLESS STEEL AND PRODUCT
Paul M. Allen, Middletown, Ohio, and Ronald H. Espy, Randallstown, and Harry Tanczyn, Baltimore, Md., assignors to Armco Steel Corporation, Middletown, Ohio, a corporation of Ohio
No Drawing. Filed Mar. 16, 1965, Ser. No. 440,280
5 Claims. (Cl. 75—128)

ABSTRACT OF THE DISCLOSURE

Chromium-nickel-titanium stainless steel containing delta-ferrite, this in small amounts (i.e. 1%) up to 20% or more by volume, which steel is ductile and readily weldable and essentially consists of carbon not exceeding .07%, manganese up to 1.00%, silicon up to .75%, with chromium in the amount of 10.5% to 12.5%, nickel at least 1.0% but less than 3.0%, titanium .2% to .75%, and remainder essentially iron.

---

As a matter of introduction, our invention relates to the stainless steels and to articles and products fashioned thereof, especially to formed and welded articles.

One of the objects of our invention is the provision of a stainless steel which employs a minimum of expensive alloying additions; which readily lends itself to hot-working and cold-working, as by forging, rolling, drawing and the like, as in the production of forgings, bar and wire as well as hot-rolled plate, sheet, strip and the like, and cold-rolled sheet and strip; which steel, forgings, bars, sheet, strip and the like are strong, tough and ductile.

Another object is the provision of a low-cost stainless steel and forgings, bars, wire and various hot-worked and cold-worked sheet, strip and like flat-rolled products which readily lend themselves to fabrication as by cutting, blanking, bending, drilling and the like; which steel and products readily may be welded, brazed or the like, as in the production of a variety of articles and products, and parts thereof, of ultimate use; which formed and welded products and articles are possessed of good strength and corrosion-resistance as in the as-welded or as-brazed condition, that is, without necessity for subsequent heat-treatment.

A further object is the provision of a steel and products which are suited to wear, abrasion and corrosive attack in outdoor applications under conditions of shock, vibration and the like as encountered in use.

Other objects of the invention in part will become apparent in the course of the description which follows and still others more particularly pointed to.

Accordingly, our invention may be viewed as residing in the combination of elements, composition of ingredients, and in the relation between the same, the application of which is set out in the claims at the end of this specification.

Background of the invention

Now in order to gain a better understanding of certain features of our invention, it may be noted at this point that there are many grades of stainless steel presently available to the art. And that many of these are of comparatively low total alloy content. And some are readily workable in the hot-mill and cold-mill, and readily formable as well. None, however, enjoys a desired combination of ready formability and strength along with comparatively low cost in melting, in working in the mill, and in fabrication as well.

For example, the A.I.S.I. Type 410 (0.15% max. carbon, 1.00% max. manganese, 1.00% max. silicon, 11.5% to 13.5% chromium, 0.040% max. phosphorus, 0.030% max. sulphur, and remainder iron) is considered to be a low-cost general purpose stainless steel of good corrosion-resistance and good heat-resistance. It is hardenable by heat-treatment. In the annealed condition, sheet and strip of the Type 410 have the following mechanical properties: Tensile strength of about 70,000 pounds per square inch, .2% yield strength of about 45,000 p.s.i., elongation in 2 inches of about 25%, and a hardness of about Rockwell B80. The steel is suited to the production of coal screens, low-priced cutlery, machine parts, valve trim, and the like.

Similarly, the A.I.S.I. Type 414 (0.15% max. carbon, 1.00% max. manganese, 1.00% max. silicon, 11.5% to 13.5% chromium, 1.25% to 2.50% nickel, 0.040% max. phosphorus, 0.030% max. sulphur, and remainder iron) is viewed as another general purpose steel of good corrosion-resistance and good heat-resistance, this with somewhat greater strength than the Type 410. It is hardenable by heat-treatment to give high strength in the heat-treated condition, and prior to heat-treatment lends itself to ready forming as in the production of a variety of articles of ultimate use such as rules, straight edges, mild springs, scraper knives, and the like. In the annealed condition, sheet and strip fashioned of this steel has a tensile strength of about 120,000 pounds per square inch, a .2% yield strength of about 105,000 p.s.i., with an elongation in 2 inches of about 15% and a hardness on the order of Rockwell B98.

As a further example, there is the AM–363 steel of Allegheny-Ludlum Steel Company [1], this analyzing about .03% carbon, about .10% manganese, about .08% silicon, about 11.50% chromium, about 4% nickel, about .40% titanium, and remainder iron. This steel is said to be relatively soft in the annealed condition, to have a very low work-hardening rate, and to be capable of severe deformation without cracking. It exhibits practically no age-hardening effects. Annealed sheet fashioned of the steel (about .060 inch thickness) is said to have the following mechanical properties: Ultimate tensile strength of about 125,300 p.s.i., .2% yield strength of about 112,300 p.s.i., and an elongation in 2 inches of about 11.5%. The metal is said to possess outstanding weld properties. It is said to be fully austenitic at annealing temperatures.

While the Type 410 steel is of minimum cost, we find that its mechanical properties leave something to be desired. The same may be said of the Type 414. And the AM–363 seems expensive. Additionally, the AM–363 is somewhat harder and less ductile than desired.

Accordingly, one of the outstanding objects of our invention is the provision of a low-cost stainless steel which works well in the mill, which has good fabricating qualities, along with high strength; and which is suited to the production of a variety of articles and products including welded articles and parts thereof well adapted to withstand outdoor applications where shock and vibration are encountered along with corrosive attack.

Summary of the invention

Referring now more particularly to the practice of our invention, we provide a stainless steel essentially consisting of .04% max. carbon, .35% max. manganese, .03% max. phosphorus, .020% max. sulphur, .60% max. silicon, 11.00% to 12.00% chromium, 2.00% to less than 3.00% nickel, .35% to .60% titanium, and remainder essentially iron. More broadly, the steel of our invention may be viewed as essentially consisting of up to .07% carbon; up to 1.00% manganese, especially .25% to 1.00% manganese; up to .04% phosphorus; up to .03% sulphur, or more particularly up to .020%, especially .010% to .020% sulphur; up to .75% silicon, especially

---

[1] New Martensitic Age Hardening Stainless Steels by G. N. Aggen, C. M. Hammond, and R. A. Lula. A.S.T.M. 1963.

.20% to .60% or even to .75% silicon; 10.5% to 12.5% chromium; 1.5% to less than 3.0% nickel, or even 1.0% to less than 3.0% nickel; .2% to .75% titanium, or even titanium from 6 times the carbon content on up to .75%; and remainder essentially iron. Or it may be viewed as essentially consisting of 10.5% to 12.5% chromium, 1.5% to 3% nickel, .2% to .75% titanium, carbon not exceeding .07%, and remainder essentially iron. For best workability and formability the nitrogen content is maintained at a value not exceeding .04%. Boron may be employed in amounts up to .004%.

In the steel of our invention we find the chemical composition to be critical, particularly in matters of the carbon, manganese, silicon, chromium, nickel and titanium contents; we feel that all of these ingredients affect the structural balance. While we desire a balance which assures a martensitic structure whether the metal is in the form of forgings, bar, rod, wire, plate, hot-rolled sheet and strip, cold-rolled sheet and strip, or in subsequent fabricated form with or without heating, as by welding or brazing, we actually prefer that there be present in the steel a small but critical amount of delta-ferrite in the form of islands dispersed throughout the grains of low carbon martensite.

We feel that best formability is had where the islands of delta-ferrite are present. And in weldments, we feel that micro-fissuring is inhibited by the presence of delta-ferrite in the weld nugget. In our steel the amount of delta-ferrite ordinarily does not exceed about 15% by volume, although in some applications it may run as high as 20%. Best results are achieved with a delta-ferrite contents up to about 15% for most applications, amounting to about 1% to about 5% for a best combination of mechanical strength and toughness. Where strength is not a large factor, but ease of formability is, then the amount of delta-ferrite may run to about 20%.

It is our view that the presence of islands of delta-ferrite assures a steel of uniform, fine grain structure. And that this fine grain structure is retained with subsequent heating operations. While explanations may differ, it is our thought that the islands of delta-ferrite effectively control and limit the grain growth commonly encountered in heating the metal; the islands act as barriers between grains. And the grains in order to grow would be required to grow around the islands of delta-ferrite. With the fine grain structure there is achieved a best combination of impact strength and formability.

In our steel at least 10.5% chromium is necessary in order to enjoy the desired resistance to corrosion in outdoor applications. And a chromium content exceeding 12.5% is not desired because of the ferrite-forming tendencies of this ingredient. We feel that a higher chromum content introduces an excessive amount of delta-ferrite, this resulting in some sacrifice to the ductility and formability of the metal as in bending, pressing, and the like. Moreover, with the higher chromium content the metal becomes unduly expensive. In our steels, therefore, the chromium content amounts to 10.5% to 12.5%, actually 11.0% to 12.0% for the best combination of properties.

The nickel content of our steel too is critical. While a nickel content of 1.0% is sufficient where the manganese content is on the high side (say, .60% to 1.00% manganese) and the chromium content is on the low side (say 10.5% to 12.0% chromium) for consistent results we employ a nickel content of at least 1.5% to assure the desired amount of delta-ferrite, maintain a soft martensitic structure and permit the steel when welded to retain desired strength and hardness when cooled from welding temperatures. Nickel in excess of 3.5%, however, is not desirable because we find that ductility suffers and the formability of the metal is appreciably reduced. Moreover, with a nickel content of about 3.0% and more, delta-ferrite disappears. And, here again, with the higher nickel content the cost becomes excessive. Best results, with best control of strength and ductility, are had with a nickel content of 1.5% to less than 3.0%, especially 2.0% to less than 3.0%.

Titanium is an ingredient essential to our steel. This should be present in amount at least 6 times the carbon content of the metal in order to combine with the carbon present and form insoluble carbides, thus preventing this carbon from combining with the chromium and undesirably hardening the steel. With a bare minimum of uncombined carbon the metal remains ductile; i.e., it does not become hard and brittle in cooling from welding temperatures. Actually, the metal in the as-welded condition is of about the same strength and ductility as the parent unaffected metal. Moreover, titanium in tying up the carbon present in the metal aids the corrosion-resistance. Any substantial excess of titanium is not desirable, however, because of its strong ferrite-forming tendency and because of the inclination of uncombined titanium to oxidize in the melting, tapping and teeming operations and give dirty metal. Moreover, the higher titanium content unnecessarily adds to the cost of the steel. With the carbon content of the metal not exceeding .07% and the nitrogen content also not exceeding .04%, best results are had with a titanium content of .2% to .75%, generally .35% to .60%.

A low carbon content is desirable, i.e., a carbon content not exceeding .07%, for we find that a higher carbon content, when uncombined with titanium, increases the hardness of the martensite obtained, with the result that both the formability and the toughness of the metal are inclined to suffer. And where combined with titanium we feel that the excessive number of titanium carbide segregates which form with the higher carbon content provide stress risers and points of incipient cracking which lower formability and toughness. For maximum cleanliness and best toughness we prefer a carbon content not exceeding .04%.

In the titanium-bearing steel of our invention nitrogen is not a desirable addition. Its presence is tolerated, however, in amounts not exceeding .04%, preferably in amounts not exceeding .03% or even .02%, this because of its contribution toward the formation of titanium nitrides, which make for dirty metal, and the consequent adverse effect upon formability.

The manganese content of our steel should not exceed 1.00%, for an excess of this ingredient is inclined to unduly increase strength and decrease ductility. For best results it should not exceed .35%. We, however, prefer to employ a manganese content of at least .25% since we find that a small amount of manganese is beneficial in stabilizing the high temperature austenite of the steel; it partially serves to prevent the formation of an excess amount of delta-ferrite. Actually, for the best combination of properties we employ a manganese content of .25% to .35%.

While the silicon content of our steel should not exceed .75%, because of the ferrite-forming tendencies of this ingredient, we nevertheless prefer to employ at least .20% silicon in order to ensure an ease of melting and teeming. Best results are had where the silicon content amounts to .20% to .60%.

In our steel we maintain a sulphur content which does not exceed a maximum of .03%, preferably it does not exceed .020%, for with a higher sulphur content the metal is inclined to become objectionably dirty with consequent loss of workability and formability. Where the metal is destined for applications where welding is employed in fabrication, we employ a sulphur content of .010% to .030%, for we find that at least .010% is desired in order to achieve a fluid slag in welding, i.e., the sulphur serves as a fluxing agent for the refractory titanium oxides deriving from the welding operation. Best results are had where the metal contains a sulphur content of .010% to .020%.

The phosphorus content is maintained at a figure not exceeding .04% in accordance with usual practice.

Description of the preferred embodiments

A preferred steel which enjoys a best combination of properties essentially consists of carbon not exceeding .07%, .25% to 1.00% manganese, up to .04% max. phosphorus, up to .03% max. sulphur, .20% to .75% silicon, 10.5% to 12.5% chromium, 1.5% to less than 3.0% nickel, titanium 6 times the carbon content up to .75% max., and remainder essentially iron. Another steel according to our invention essentially consists of carbon up to .04%, nitrogen not exceeding .04%, up to 1.00% manganese, up to .04% phosphorus, up to .20% sulphur, .20% to .60% silicon, 10.5% to 12.5% chromium, 1.5% to less than 3.0% nickel, .2% to .75% titanium, boron up to .004%, and the remainder essentially iron. A further steel having good forming properties and good welding characteristics essentially consists of carbon up to .04%, nitrogen not exceeding .04%, .25% to 1.00% manganese, up to .04% phosphorus, .010% to .030% sulphur, up to .75% silicon, 10.5% to 12.5% chromium, 1.5% to less than 3.0% nickel, .2% to .75% titanium, and remainder essentially iron. And a still further steel, this also having good forming and good welding characteristics, essentially consists of .04% max. carbon, .25% to .35% manganese, .03% max. phosphorus, .010% to .020% sulphur, .20% to .60% silicon, 11.00% to 12.00% chromium, 2.00% to less than 3.00% nickel, .2% to .6% titanium, and the remainder essentially iron.

In the production of our steel the metal conveniently is melted in the electric arc furnace. Where desired, however, it may be melted in the induction furnace. Other melting techniques, of course, may be employed, although we find that satisfactory steel is had at minimum cost through electric arc furnace melting.

However melted, the steel of our invention conveniently is cast in the form of ingots from which it is converted into slabs, blooms or billets. It is then further converted into plate, sheet, strip, bars, rods and wire through conventional hot-rolling technique. Where desired, of course, the metal may be forged.

The stainless steel of our invention, as for example in the form of either hot-rolled or cold-rolled sheet, strip, and the like, readily may be cut, blanked, and formed into a variety of structural components. It is substantially martensitic in structure although some delta-ferrite commonly is present as noted above. The metal has a low work-hardening rate. Typically, the metal may be bent 180 degrees over the diameter of twice its thickness, this without cracking or crazing. In preferred composition the metal may be bent flat against itself without cracking. Our steel, of course, readily may be cut, drilled or machined. And it readily may be welded, brazed or the like, as in the fabrication of a variety of articles and products of ultimate use and parts thereof, by the standard fusion-welding and resistance-welding techniques which commonly are applied to the known grades of stainless steel sheet and strip. And no loss of strength, hardness or corrosion-resistance is suffered as a result of the heating had in these operations.

In welding our steel, the known gas-tungsten arc process, either with or without the application of filler metal may be resorted to. Where a weld filler is to be employed, however, it is generally desirable to employ a filler material having about the same chemical composition as that of the base material. In those applications where the steel of our invention is being joined to any of the standard austenitic stainless stels by the gas-tungsten arc process, we generally employ a highly alloyed chromium-nickel stainless steel filler material, for example, the Type 309, analyzing about 22% to 24% chromium, 12% to 15% nickel, carbon about 0.20% max., and the remainder iron.

As specifically illustrative of the steel of our invention in which a best combination of properties is had, we give below in Table I the chemical composition of two steels, one enjoying said combination and the other not, these steels having been melted in the induction furnace, cast into ingots, and hot-rolled and then cold-rolled into strip, as more particularly noted below:

TABLE I.—CHEMICAL COMPOSITION OF TWO STEELS

| Heat No. | C | Mn | P | S | Si | Cr | Ni | N | Ti |
|---|---|---|---|---|---|---|---|---|---|
| R-4913-1* | .024 | .24 | .022 | .017 | .23 | 11.20 | 2.09 | .014 | .37 |
| R-4913-2 | .022 | .24 | .021 | .017 | .23 | 11.19 | 3.14 | .013 | .29 |

*Steel enjoying a best combination of properties. The remainder of the composition is iron.

TABLE II(a).—MECHANICAL PROPERTIES OF HEAT R-4913-1 OF TABLE I

| Condition | Hardness $R_B$-$R_C$ | Bend. Long. | U.T.S., p.s.i. | 0.2% Y.S., p.s.i. | Percent Elong. in 2" |
|---|---|---|---|---|---|
| Cold Rolled | 25.5 | | | | |
| 1,500° F.:[1] | | | | | |
| +950° F.[2] | 96.0 | Fl[3] | 97,200 | 82,100 | 17 |
| +1,050° F.[2] | 95.5 | Fl | 96,900 | 83,100 | 18 |
| 1,600° F.: | | | | | |
| +950° F | 98.0 | Fl | 100,800 | 88,200 | 14 |
| +1,050° F | 97.0 | Fl | 100,500 | 88,200 | 15 |
| 1,700° F.: | | | | | |
| +950° F | 23.0 | 2.5T[4] | 111,000 | 99,100 | 11 |
| +1,050° F | 23.0 | 1.5T | 111,100 | 101,700 | 14 |
| 1,800° F.: | | | | | |
| +950° F | 28.0 | 3.0T | 122,500 | 109,400 | 8 |
| +1,050° F | 27.0 | 2.0T | 121,800 | 112,500 | 10 |

TABLE II(b).—MECHANICAL PROPERTIES OF HEAT R-4913-2 OF TABLE I

| Condition | Hardness $R_B$-$R_C$ | Bend. Long. | U.T.S., p.s.i. | 0.2% Y.S., p.s.i. | Percent Elong. in 2" |
|---|---|---|---|---|---|
| Cold Rolled | 26.5 | | | | |
| 1,400° F.:[1] | | | | | |
| +950° F.[2] | 22.0 | 1.5T[4] | 109,300 | 99,800 | 14 |
| +1050° F.[2] | 20.0 | 1.0T | 105,500 | 95,400 | 16 |
| 1,500° F.: | | | | | |
| +950° F | 22.0 | 0.5T | 109,100 | 100,600 | 15 |
| +1050° F | 21.0 | 2.5T | 105,600 | 96,900 | 16 |
| 1,600° F.: | | | | | |
| +950° F | 24.0 | 2.5T | 127,500 | 107,600 | 12 |
| +1050° F | 24.0 | 1.0T | 116,300 | 109,000 | 12 |
| 1,700° F.: | | | | | |
| +950° F | 27.0 | 3.0T | 124,700 | 118,000 | 9 |
| +1050° F | 27.0 | 1.5T | 122,500 | 116,000 | 10 |

[1] Hardening Temperature.
[2] Tempering Temperature.
[3] Fl, bent flat against self.
[4] T, bent 180° around thickness of metal indicated.

In processing the samples of steels noted in Table I the metal was rolled into a strip of about .100 to .110″ thickness. The rolling was effected at a temperature of 2050° to 2100° F. Following the hot-rolling operation the strip was annealed at 1500° F., then grit-blasted and pickled, pickling being had in 15% nitric acid-3% hydrofluoric acid aqueous solution, then cold-rolled to a thickness of .050″. Where desired, we find that the annealing step may be eliminated without adverse effect.

The samples of cold-rolled strip were solution-treated at temperatures ranging from 1400° to 1800° F. and stress-relieved, some at 950° F. and others at 1050° F. The mechanical properties of the two heats of steel, Heat R-4913-1 of 2.09% nickel content, and the Heat R-4913-2 of 3.14% nickel content, are given above in Tables II(a) and II(b):

It will be seen from Table II(a) above that the Heat R-4913-1 with a nickel content of 2.09% has a hardness in quench-hardened and tempered condition of about Rockwell B95.5 to 98.0, with a tensile strength amounting to some 96,900 to 100,800 p.s.i., a yield strength of 82,100 to 88,200 p.s.i. and an elongation in 2″ of some 14% to 18%, the particular figures depending upon whether the hardening is had at 1500° F. or 1600° F. and tempering at 950° F. or 1050° F. The steel readily may be bent flat against itself without crack or craze. When hardened by quenching from higher temperatures, i.e. 1700° F. and 1800° F. and then tempered at 950° F. or 1050° F., greater hardness and strength are had at a sacrifice to the bending properties. The strip, when hardened at the higher temperatures and tempered nevertheless may be bent 180° about a radius of 1½ to 3 times its thickness without adverse effect; that is, without crack or craze.

Similarly, it will be seen from Table II(b) above for Heat R-4913-2 with a nickel content of 3.14%, the steel in cold-rolled condition has a hardness of Rockwell C26.5. When quench-hardened from 1400° F. to 1500° F. and tempered from 950° F. to 1050° F., the hardness amounts to some Rockwell C20.0 to 22.0, with tensile strength of 105,500 to 109,300 p.s.i., yield strength of 95,400, to 100,600 p.s.i., and elongation in 2″ of from 14% to 16%. While the high nickel steel may not be bent flat against itself without cracking or crazing, it nevertheless may be bent 180° over a thickness of some ½ to 2½ times the thickness of the metal, when properly heat-treated. Actually, the longitudinal bend test reveals best bend properties for the metal hardened at 1500° F. and tempered at 950° F., i.e. 180° bend over a thickness of only one-half the thickness of the metal.

Full 180° bends over a thickness of 2½ times that of the metal nevertheless are had where quench-hardening is effected throughout a somewhat broader range of temperatures, i.e., some 1400° to 1600° F., with tempering at 950° to 1050° F. With the higher quench-hardening temperature somewhat greater strengths are achieved with slight sacrifice in the percent elongation figure, namely a tensile strength of 116,300 to 127,500 p.s.i., a yield strength of 107,600 to 109,000 p.s.i., with elongation in 2″ of 12%. Even better yield strength is achieved with quench-hardening from 1700° F. and tempering at 950° F. to 1050° F., namely 116,000 to 118,000 p.s.i. The metal is harder, however, i.e., Rockwell C27.0, and does not bend as well, although a 180° bend nevertheless may be reliably achieved over a thickness of 3 times that of the metal.

In conclusion, it will be seen, therefore, that we provide in our invention a quench-hardenable steel in which there is achieved the various objects set forth above, together with many practical advantages. The steel of our invention is comparatively inexpensive in that it employs a minimum of expensive alloying ingredients, and because it may be given a short routing through the steel mill, i.e., through elimination of the usual annealing treatment between the hot-rolling operation and the cold-rolling of the metal into sheet, strip and the like.

The steel of our invention, while essentially martensitic in structure, essentially contains a small but controlled amount of delta-ferrite in the form of small islands, the delta-ferrite being up to some 15% or even to 20% or more by volume. And while the steel is possessed of a low work-hardening rate and readily lends itself to various bending, pressing, blanking and like operations, it nevertheless is of good hardness, strength and corrosion-resistance. Moreover, it readily may be welded or brazed in the fabrication of a variety of high strength structural components for use in the transportation, processing and building industries. And the welded structures are intended for use in the as-welded or as-brazed condition without necessity for heat-treatment following the welding or brazing operations and without loss of hardness and strength.

Inasmuch as many embodiments may be made of our invention and inasmuch as many modifications may be made in the embodiments set forth above, it will be understood that all matter described herein is intended to be by way of illustration and not by way of limitation.

We claim as our invention:

1. Alloy steel containing delta-ferrite from 1% to 20% or more by volume and essentially consisting of carbon not exceeding .07%, .25% to 1.00% manganese, up to .04% max. phosphorus, up to .03% max. sulphur, up to .75% silicon, 10.5% to 12.5% chromium, at least 1.0% but less than 3.0% nickel, titanium 6 times the carbon content up to .75% max., and remainder essentially iron.

2. Alloy steel containing 1% to 20% delta-ferrite by volume and having good forming properties and essentially consisting of carbon up to .04%, nitrogen not exceeding .04%, up to 1.00% manganese, up to .04% phosphorus, up to .020% sulphur, .20% to .60% silicon, 10.5% to 12.5% chromium, 1.5% to less than 3.0% nickel, .2% to .75% titanium, boron up to .004%, and remainder essentially iron.

3. Alloy steel containing delta-ferrite in the amount of 1% to 20% by volume and having good forming properties and essentially consisting of carbon not exceeding .04%, nitrogen not exceeding .04%, .60% to 1.00% manganese, .20% to .75% silicon, 10.5% to 12.0% chromium, at least 1.0% but less than 3.0% nickel, .2% to .6% titanium, and remainder essentially iron.

4. Alloy steel containing delta-ferrite in the amount of 1% to 20% by volume and having good forming and good welding characteristics and essentially consisting of carbon up to .04%, nitrogen not exceeding .04%, .25% to 1.00% manganese, up to .04% phosphorus, .010% to .030% sulphur, up to .75% silicon, 10.5% to 12.5% chromium, 1.5% to less than 3.0% nickel, .2% to .75% titanium, and remainder essentially iron.

5. Alloy steel containing delta-ferrite in the amount of 1% to 20% by volume and having good forming and good welding characteristics and essentially consisting of .04% max. carbon, .25% to .35% manganese, .03% max. phosphorus, .010% to .020% sulphur, .20% to .60% silicon, 11.00% to 12.00% chromium, 2.00% to less than 3.00% nickel, .2% to .6% titanium, and remainder essentially iron.

References Cited

UNITED STATES PATENTS

| | | | |
|---|---|---|---|
| 1,538,337 | 5/1925 | Kuehn | 75—128 |
| 2,891,859 | 6/1959 | Kegerise | 148—37 X |
| 2,999,039 | 9/1961 | Lula | 148—37 |
| 3,250,611 | 5/1966 | Lula | 148—37 |
| 3,288,611 | 5/1966 | Lula | 75—128 |

DAVID L. RECK, *Primary Examiner.*

HYLAND BIZOT, *Examiner.*

P. WEINSTEIN, *Assistant Examiner.*